(12) United States Patent
Yoon et al.

(10) Patent No.: US 8,498,472 B2
(45) Date of Patent: Jul. 30, 2013

(54) IMAGE-BASED LOCALIZATION FEATURE POINT REGISTRATION APPARATUS, METHOD AND COMPUTER-READABLE MEDIUM

(75) Inventors: Suk June Yoon, Seoul (KR); Kyung Shik Roh, Seongnam-si (KR); Seung Yong Hyung, Yongin-si (KR); Sung Hwan Ahn, Anyang-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 178 days.

(21) Appl. No.: 12/979,036

(22) Filed: Dec. 27, 2010

(65) Prior Publication Data

US 2011/0164832 A1 Jul. 7, 2011

(30) Foreign Application Priority Data

Jan. 4, 2010 (KR) .................. 10-2010-0000272

(51) Int. Cl.
*G06K 9/32* (2006.01)
*G06T 15/10* (2011.01)

(52) U.S. Cl.
USPC .................. 382/154; 382/294; 345/427

(58) Field of Classification Search
USPC .............. 382/115, 118, 154, 181, 231, 294, 382/203, 209, 228, 285; 345/419, 427
See application file for complete search history.

(56) References Cited

U.S. PATENT DOCUMENTS

| | | | | |
|---|---|---|---|---|
| 4,630,225 A | * | 12/1986 | Hisano | 702/153 |
| 7,894,636 B2 | * | 2/2011 | Kozakaya | 382/118 |
| 7,925,060 B2 | * | 4/2011 | Norita et al. | 382/118 |
| 8,023,724 B2 | * | 9/2011 | Barbour | 382/154 |
| 8,165,354 B1 | * | 4/2012 | Zhao | 382/118 |
| 2009/0116732 A1 | * | 5/2009 | Zhou et al. | 382/154 |

* cited by examiner

*Primary Examiner* — Sheela Chawan
(74) *Attorney, Agent, or Firm* — Staas & Halsey LLP

(57) ABSTRACT

An image-based localization feature point registration apparatus includes a camera to capture an image, a feature point extractor to extract a feature point from the captured image, a calculator to calculate depth information about the feature point according to whether the feature point is one of two-dimensional (2D) and a three-dimensional (3D) corner, and a feature point register to register 3D coordinates of the feature point based on the depth information about the feature point and image coordinates of the feature point.

14 Claims, 5 Drawing Sheets

IMAGE-BASED LOCALIZATION FEATURE POINT REGISTRATION APPARATUS, METHOD AND COMPUTER-READABLE MEDIUM

CROSS-REFERENCE TO RELATED APPLICATIONS

This application claims the benefit of Korean Patent Application No. 10-2010-0000272, filed on Jan. 4, 2010 in the Korean Intellectual Property Office, the disclosure of which is incorporated herein by reference.

BACKGROUND

1. Field

Example embodiments relate to an apparatus to extract feature points from an image and registering the extracted feature points for image-based localization, and a related method and computer-readable medium.

2. Description of the Related Art

To autonomously move, a robot needs to keep track of its current location within an unknown environment without a priori knowledge (localization), while at the same time, building up a map based on information about the environment (mapping). This is called Simultaneous Localization And Mapping (SLAM).

SLAM is an image-based localization technique that allows for real-time mapping and self-localization, based on images captured by an omni-directional camera. For the image-based localization, feature points are extracted from an image, the three-dimensional (3D) coordinates of the feature points are calculated, and then the feature points are registered as 3D feature points. Corner points are usually used as feature points in an image because the corners allow robust tracking when the image moves. To extract such 3D information, a stereo vision/Time Of Flight (TOF) camera is usually used. However, when 3D information about a corner is extracted, no values are acquired from the stereo vision/TOF camera in some cases. While the stereo vision/TOF camera relies on the disparity between two images to acquire 3D information, it may not get 3D information about corner points due to occlusion that occurs to a 3D object. In addition, the TOF camera suffers from diffraction at corners, making it difficult to identify corners accurately. Consequently, 3D information about the corners may not be gathered.

SUMMARY

Therefore, it is an aspect of the example embodiments to provide an image-based localization feature point registration apparatus, method and computer-readable medium identifying whether a feature point recognized as a corner in an image is a two-dimensional (2D) or three-dimensional (3D) corner, acquiring depth information about the feature point according to whether the feature point is one of a 2D and a 3D corner, and registering the feature point as a 3D feature point based on the depth information and image coordinates of the feature point.

The foregoing and/or other aspects are achieved by providing an image-based localization feature point registration apparatus including a camera to capture an image, a feature point extractor to extract a feature point from the captured image, a calculator to calculate depth information about the feature point according to whether the feature point is one of a 2D and a 3D corner, and a feature point register to register 3D coordinates of the feature point based on the depth information about the feature point and image coordinates of the feature point.

The feature point extractor may acquire 3D information about a window including the feature point.

The feature point registration apparatus may further include a corner identifier to determine whether the feature point is one of a 2D and a 3D corner based on the 3D information about the window including the feature point.

If the feature point is a 2D corner, the calculator may calculate an average depth of an entire area of the window as the depth information about the feature point.

If the feature point is a 3D corner, the calculator may extract a foreground area from the image and calculate an average depth of the foreground area as the depth information about the feature point.

The calculator may separate the foreground area and a background area from the image by calculating a depth distribution of the window.

The foregoing and/or other aspects are achieved by providing an image-based localization feature point registration method including capturing an image by a camera, extracting, by a processor, a feature point from the captured image, acquiring, by the processor, 3D information about a window including the feature point, determining, by the processor, whether the feature point is one of a 2D and a 3D corner based on the 3D information about the window, calculating, by the processor, depth information about the feature point according to whether the feature point is one of the 2D and the 3D corner, and registering, by the processor, 3D coordinates of the feature point based on the depth information about the feature point and image coordinates of the feature point.

If the feature point is a 2D corner, an average depth of an entire area of the window may be calculated as the depth information about the feature point.

If the feature point is a 3D corner, a foreground area and a background area may be separated from the image according to a depth distribution of the window.

If the feature point is a 3D corner, an average depth of the foreground area may be calculated as the depth information about the feature point.

The foregoing and/or other aspects are achieved by providing at least one non-transitory computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
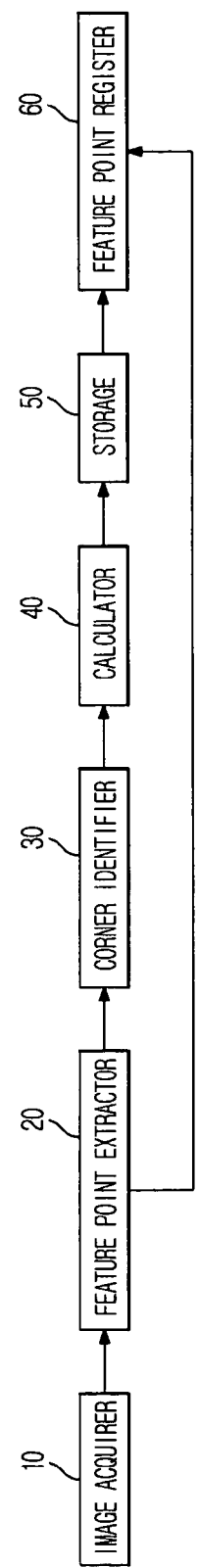
FIG. 1 is a control block diagram illustrating an image-based localization feature point registration apparatus according to example embodiments.

Reference will now be made in detail to the embodiments, examples of which are illustrated in the accompanying drawings, wherein like reference numerals refer to like elements throughout.

FIG. 1 is a control block diagram of an image-based localization feature point registration apparatus according to example embodiments. The feature point registration apparatus may include an image acquirer 10, a feature point extractor 20, a corner identifier 30, a calculator 40, a storage 50, and a feature point register 60.

Referring to FIG. 1, the image acquirer 10 may be three-dimensional (3D) measurement equipment (e.g. a stereo vision camera, a Time Of Flight (TOF) camera, etc.) that captures images along a path during moving in an unknown environment without a priori knowledge and acquires 3D information about various objects (e.g. a shelf, a stand, etc.) in the path. The 3D measurement equipment may acquire a camera image and 3D information (i.e. depth information) because the 3D measurement equipment may get image information and distance information about detected objects at each pixel of a camera. The image acquirer 10 may be used for an Information Technology (IT) device such as a gaming device, a portable phone, a smart phone, etc. as well as an intelligent robot.

The feature point extractor 20 may extract feature points from the 3D information about the image acquired by the image acquirer 10, and acquire 3D information (depth information) about the feature points. A robot may select, as the feature points, points having quantitative characteristics constant over time and at any observation angle from an environment in which the robot is moving. In general, feature points constant at any angle may be found from corners because the corners are robustly tracked when an image moves.

Thus the feature point extractor 20 may extract a feature point from the image acquired by the 3D measurement equipment, i.e. the image acquirer 10 and acquire 3D information (depth information) about a window (e.g. a 11×11 window) including the feature point.

The corner identifier 30 may determine whether the feature point in the image is one of a 2D and a 3D corner based on the 3D information (depth information) about the window, and the feature point may be recognized as a corner in the image and classified as one of a 2D and a 3D corner.

If the feature point is a 3D corner, discontinuity may exist in the 3D information about the window. When a stereo vision camera is used as the 3D measuring equipment, such as the image acquirer 10, a disparity map should be accurately calculated to acquire 3D information based on the disparity between two stereo images. However, with an error in the disparity map, an occlusion phenomenon may occur, in which a point in one image does not appear in the other image. As a consequence, 3D information may not be acquired from corners. In addition, if a TOF camera is used as the 3D measuring equipment, i.e. the image acquirer 10, diffraction at corners may make it difficult to identify the corners correctly. Hence, accurate 3D information may not be acquired.

Accordingly, the corner identifier 30 may identify whether a feature point in an image is a 2D corner or a 3D corner in a real space based on 3D information (depth information) about a window including the feature point extracted by the feature point extractor 20.

The calculator 40 may calculate depth information (or depth value) about the feature point according to whether the feature point is identified as one of a 2D and a 3D corner.

If a feature point of an image is identified as a 2D corner in the corner identifier 30, the calculator 40 may calculate the average of depths for a window size, i.e., the average depth of the entire window area as the depth value of the 2D corner.

$$D(i, j) = \frac{\sum_{i=N} \sum_{j=M} \text{depth}(i, j)}{N} \quad \text{[Equation 1]}$$

When the calculator 40 calculates the depth value of a 2D corner by [Equation 1], i, j may denote the window size of an (i, j) area among (x, y) pixel coordinates in the window area including the feature point.

If the feature point in the image is identified as a 3D corner by the corner identifier 30, the calculator 40 may extract a background area and a foreground area by calculating a depth distribution, i.e. depth variations of the window. For an 11×11 window, an area with the least depth may be extracted as the foreground area. Notably, the minimum number of (i, j) areas may be limited according to the window size, taking into account an error in a disparity map.

Thus, the calculator 40 may calculate the average depth of the foreground area as the depth of the 3D corner by [Equation 1].

When the calculator 40 calculates the depth value of a 3D corner by [Equation 1], i, j may denote the window size of an (i, j) area among (x, y) pixel coordinates in the window area including the feature point.

The storage 50 may store the depth information about the feature point, calculated according to whether the feature point is identified as one of a 2D and a 3D corner. When the feature point is identified as a 2D corner, the storage 50 may store the average depth of the entire window area as the depth of the feature point. When the feature point is identified as a 3D corner, the storage 50 may store the average depth of the foreground area as the depth of the feature point.

The feature point register 60 may calculate the 3D coordinates (X, Y, Z) of the feature point using the depth information about the feature point stored in the storage 50 and the image coordinates (x, y) of the feature point extracted by the feature point extractor 20, and register the 3D coordinates (X, Y, Z) of the feature point as a 3D feature landmark.

The image-based localization feature point registration apparatus and an image-based localization feature point registration method will be described in terms of operation and effects.

Figure 2:
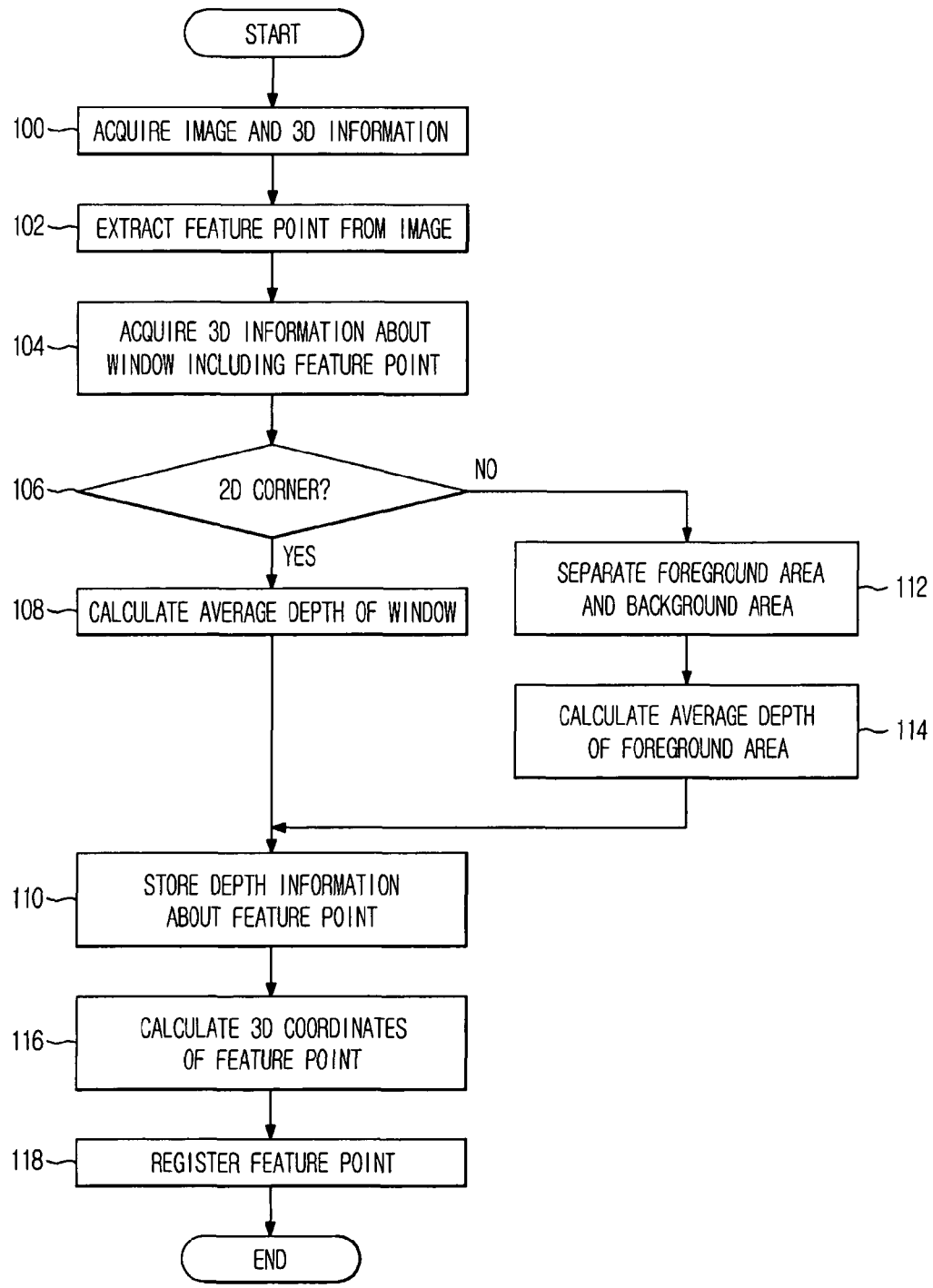
FIG. 2 is a flowchart illustrating an image-based localization feature point registration method according to example embodiments.
Figure 3:
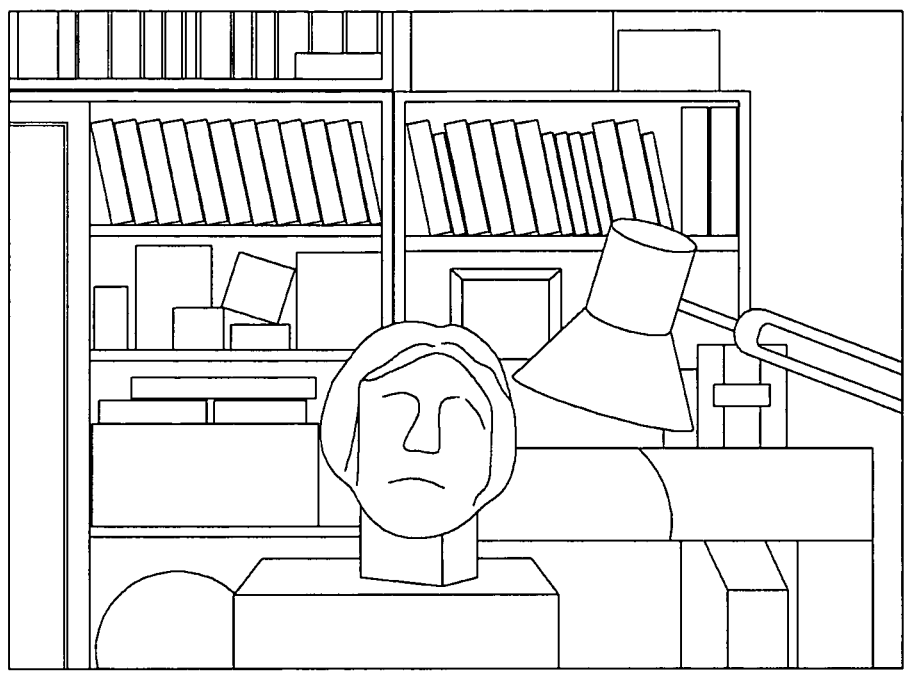
FIG. 3 illustrates an actual image from which feature points may be extracted according to example embodiments.
Figure 4:
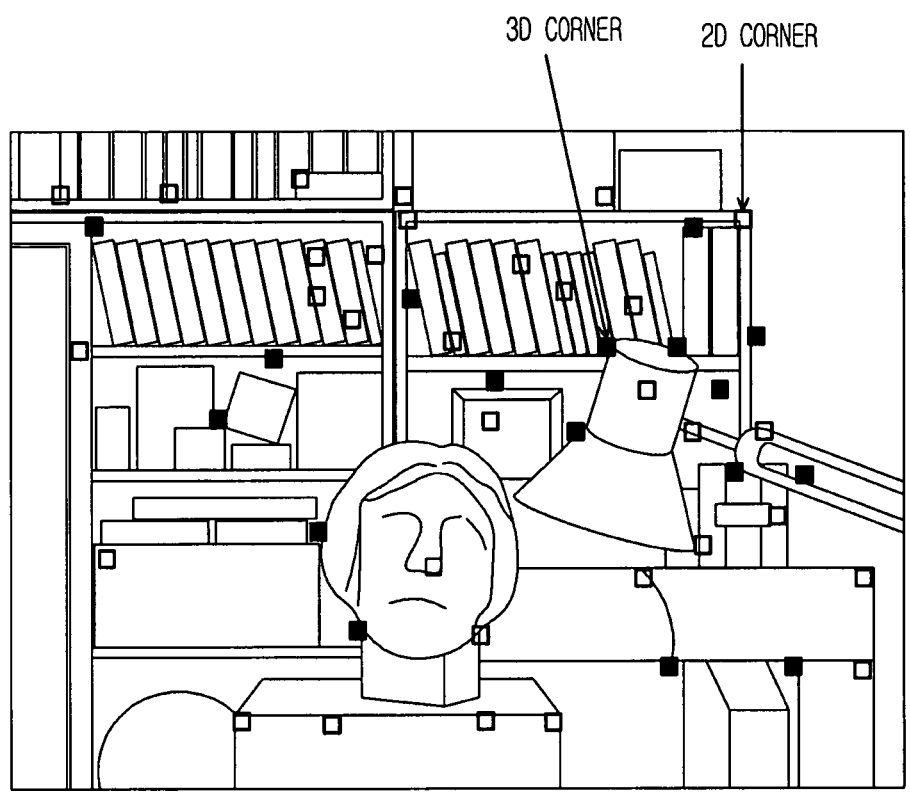
FIG. 4 is a conceptual view of feature point extraction according to example embodiments.
Figure 5:
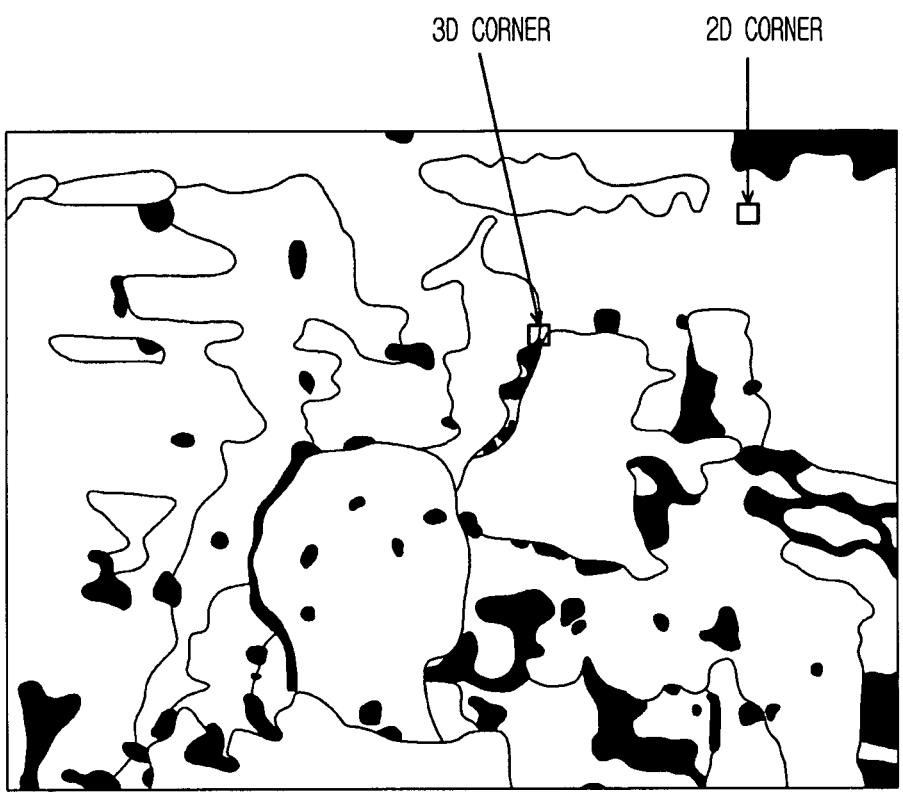
FIG. 5 is a conceptual view of feature points which are two-dimensional (2D) and three-dimensional (3D) corners according to example embodiments.

FIG. 2 is a flowchart illustrating an image-based localization feature point registration method according to example embodiments, FIG. 3 illustrates an actual image from which feature points are extracted according to example embodiments, FIG. 4 is a conceptual view of feature point extraction according to example embodiments, and FIG. 5 is a conceptual view of feature points that are 2D and 3D corners according to example embodiments.

Referring to FIG. 2, when a robot moves in a unknown environment without a priori knowledge, the image acquirer 10 of the robot may capture images of objects (e.g. a shelf, a stand, etc.) in its moving path and 3D information (depth information) about the captured images in 100, as illustrated in FIG. 3.

The feature point extractor 20 may receive the 3D information about an image acquired by the image acquirer 10 and extract a feature point recognized as a corner in the image in 102, as illustrated in FIG. 4. As shown in FIG. 4, a corner may be used as a feature point that is constant at any angle because the corner may allow robust tracking when the image moves.

After the feature point is extracted, the feature point extractor 20 may acquire 3D information (depth information) about a window (e.g. an 11×11 window) including the extracted feature point in 104.

In 106, the corner identifier 30 may determine whether the feature point of the image is a 2D corner (planar) based on the 3D information (depth information) about the window. A feature point recognized as a corner in an image may be a planar 2D corner or a 3D corner in a real space. Accordingly, the corner identifier 30 may determine whether the feature point of the image is a 2D corner (e.g. a shelf) or a 3D corner (e.g. a stand), as illustrated in FIG. 5. Because discontinuity exists in 3D information (depth information) about a 3D feature point, a decision should be made as to information to be used for initialization of the 3D feature point. This may be done in case 3D information may not be acquired, when 3D information about a 3D corner is extracted.

If the feature point of the image is identified as a 2D corner in 106, the calculator 40 may calculate the average of depths for a window size, i.e. the average depth of the entire window area by [Equation 1].

$$D(i, j) = \frac{\sum_{i=N}\sum_{j=M} depth(i, j)}{N}$$ [Equation 1]

When the calculator 40 calculates the depth value of a 2D corner by [Equation 1], i, j may denote the window size of an (i, j) area among (x, y) pixel coordinates in the window area including the feature point.

The average depth calculated by [Equation 1] may be used as the depth value of the 2D corner.

In 110, the depth value of the 2D corner, i.e. the depth information about the feature point identified as a 2D corner, may be stored in the storage 50.

On the other hand, if the feature point of the image is identified as a 3D corner in 106, the calculator 40 may extract a background area and a foreground area separately from the image by calculating a depth distribution of the window, and separate an area with the least depth as the foreground area in 112.

Then the calculator 40 may calculate the average depth of the foreground area by [Equation 1] in 114.

$$D(i, j) = \frac{\sum_{i=N}\sum_{j=M} depth(i, j)}{N}$$ [Equation 1]

When the calculator 40 calculates the depth value of a 3D corner by [Equation 1], i, j may denote the window size of an (i, j) area among (x, y) pixel coordinates in the window area including the feature point.

In 110, the depth value of the 3D corner, i.e. the depth information about the feature point identified as a 3D corner, may be stored in the storage 50.

After the depth information about the feature point is stored, the feature point register 60 may calculate the 3D coordinates (X, Y, Z) of one of the 2D and the 3D corner based on the image coordinates (x, y) of one of the 2D and 3D corner extracted by the feature point extractor 20 and the depth information about one of the 2D and the 3D corner stored in the storage 50 in 116.

In 118, the 3D coordinates (X, Y, Z) of the feature point may be registered as a 3D landmark.

Since a feature point identified as a corner in an image may be classified as one of a 2D and a 3D corner, failure in 3D information acquisition is prevented. Accordingly, image-based localization may be performed with an increased SLAM performance.

While the example embodiments have been described in as being related to an autonomous robot such as a home cleaning robot, a service robot in a public place, or an intelligent humanoid robot, by way of example, this should not be construed as limiting the example embodiments. Therefore, the feature point registration apparatus according to the example embodiments may be mounted on a portable phone or carried in a wearable fashion, to thereby notify a direction to take by localization. Furthermore, the feature point registration apparatus according to the example embodiments may be mounted on a vehicle, allowing the vehicle to reach a destination without a driver or automatically park. In this manner, the feature point registration apparatus and the feature point registration method according to the example embodiments may be applicable to a variety of applications.

As is apparent from the above description, according to the image-based localization feature point registration apparatus and related method, a feature point recognized as a corner in an image may be classified as one of a 2D and a 3D corner, its depth information may be obtained according to whether the feature point is one of a 2D and a 3D corner, and the 3D coordinates of the feature point may be stably registered based on the image coordinates and depth information of the feature point. Thus, a robot may perform image-based localization accurately. As a consequence, Augmented Reality (AR) based on image-based localization of a robot may be more effectively achieved.

The above-described embodiments may be recorded in non-transitory computer-readable media including program instructions to implement various operations embodied by a computer. The media may also include, alone or in combination with the program instructions, data files, data structures, and the like. Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although embodiments have been shown and described, it should be appreciated by those skilled in the art that changes may be made in these embodiments without departing from the principles and spirit of the disclosure, the scope of which is defined in the claims and their equivalents.

What is claimed is:

1. An image-based localization feature point registration apparatus, comprising:
   a camera to capture an image;
   a feature point extractor to extract a feature point from the captured image;
   a calculator to perform a first calculation to obtain depth information about the feature point if the feature point is a two-dimensional (2D) corner and to perform a second calculation, different from the first calculation, to obtain depth information about the feature point if the feature point is a three-dimensional (3D) corner; and
   a feature point register to register 3D coordinates of the feature point based on the depth information about the feature point and image coordinates of the feature point.

2. The feature point registration apparatus according to claim 1, wherein the feature point extractor acquires 3D information about a window including the feature point.

3. The feature point registration apparatus according to claim 2, further comprising a corner identifier to determine whether the feature point is one of the 2D and the 3D corner based on the 3D information about the window including the feature point.

4. The feature point registration apparatus according to claim 3, wherein if the feature point is a 2D corner, the calculator calculates an average depth of an entire area of the window as the depth information about the feature point.

5. The feature point registration apparatus according to claim 3, wherein if the feature point is a 3D corner, the calculator extracts a foreground area from the image and calculates an average depth of the foreground area as the depth information about the feature point.

6. The feature point registration apparatus according to claim 3, wherein the calculator separates a foreground area and a background area from the image by calculating a depth distribution of the window.

7. An image-based localization feature point registration method, comprising:
   capturing an image by a camera;
   extracting, by a processor, a feature point from the captured image and acquiring three-dimensional (3D) information about a window including the feature point;
   determining, by the processor, whether the feature point is one of a two-dimensional (2D) and a 3D corner based on the 3D information about the window;
   calculating, by the processor, depth information about the feature point using a first calculation if the feature point is a 2D corner; and
   calculating, by the processor, depth information about the feature point using a second calculation, different from the first calculation, if the feature point is a 3D corner; and
   registering, by the processor, 3D coordinates of the feature point based on the depth information about the feature point and image coordinates of the feature point.

8. The feature point registration method according to claim 7, wherein if the feature point is a 2D corner, the calculating comprises calculating an average depth of an entire area of the window as the depth information about the feature point.

9. The feature point registration method according to claim 7, further comprising, if the feature point is a 3D corner, separating a foreground area and a background area from the image according to a depth distribution of the window.

10. The feature point registration method according to claim 9, wherein if the feature point is the 3D corner, the calculating comprises calculating an average depth of the foreground area as the depth information about the feature point.

11. At least one non-transitory computer readable medium comprising computer readable instructions that control at least one processor to implement a method, comprising:
    capturing an image by a camera;
    extracting a feature point from the captured image and acquiring three-dimensional (3D) information about a window including the feature point;
    determining whether the feature point is one of a two-dimensional (2D) and a 3D corner based on the 3D information about the window;
    calculating depth information about the feature point using a first calculation if the feature point is a 2D corner; and
    calculating depth information about the feature point using a second calculation, different from the first calculation, if the feature point is a 3D corner; and
    registering 3D coordinates of the feature point based on the depth information about the feature point and image coordinates of the feature point.

12. The at least one non-transitory computer readable medium comprising computer readable instructions that control at least one processor to implement the method of claim 11, wherein if the feature point is a 2D corner, the calculating comprises calculating an average depth of an entire area of the window as the depth information about the feature point.

13. The at least one non-transitory computer readable medium comprising computer readable instructions that control at least one processor to implement the method of claim 11, further comprising, if the feature point is a 3D corner, separating a foreground area and a background area from the image according to a depth distribution of the window.

14. The at least one non-transitory computer readable medium comprising computer readable instructions that control at least one processor to implement the method of claim 13, wherein if the feature point is the 3D corner, the calculating comprises calculating an average depth of the foreground area as the depth information about the feature point.

* * * * *